Nov. 23, 1926.  1,607,848
R. B. RICHARDSON
PRESSURE REGULATOR
Filed Sept. 11, 1922    4 Sheets-Sheet 3
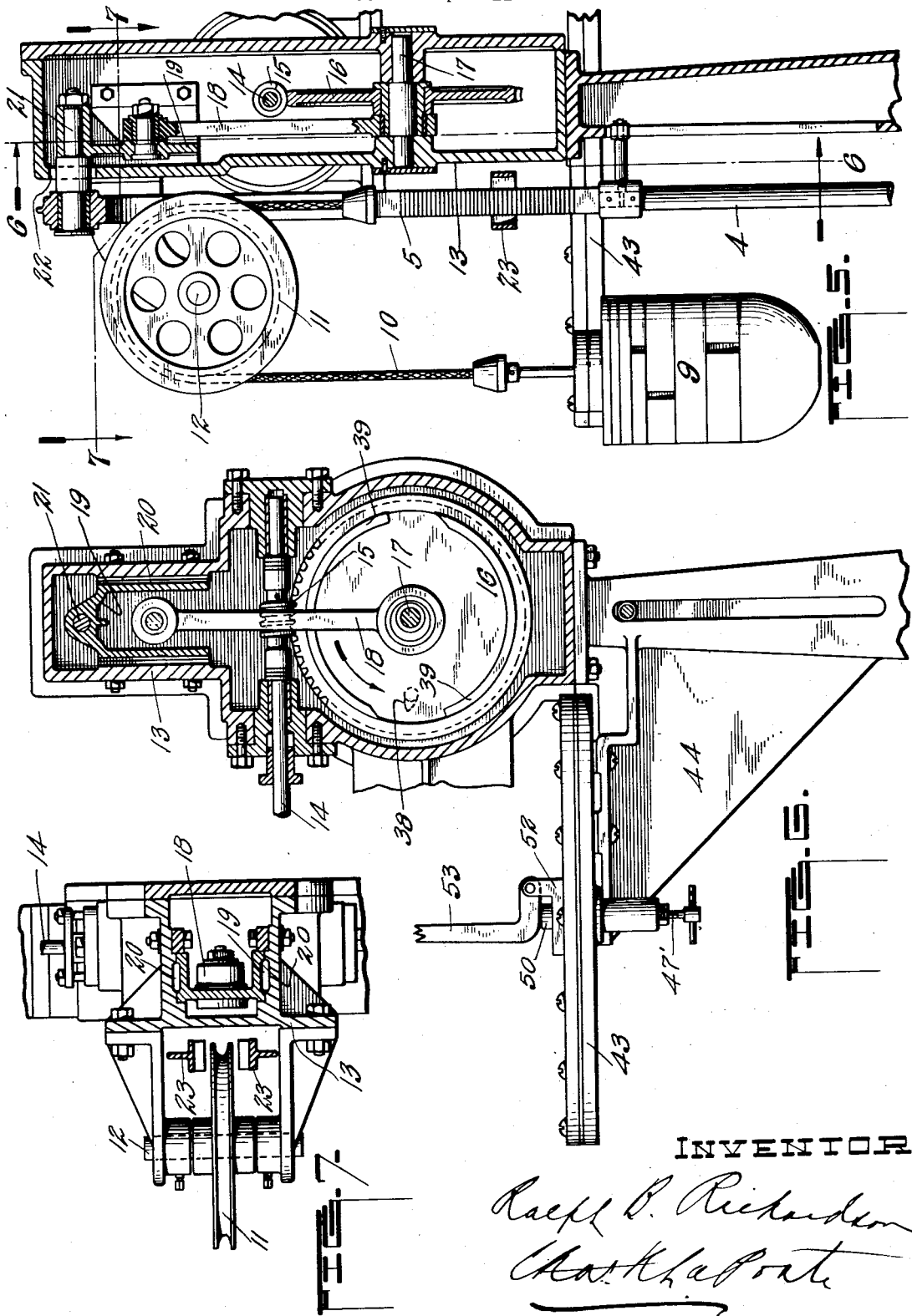
INVENTOR.
Ralph B. Richardson
Chas. K. LaPorte
ATTY Nov. 23, 1926.
1,607,848
R. B. RICHARDSON
PRESSURE REGULATOR
Filed Sept. 11, 1922  4 Sheets-Sheet 4
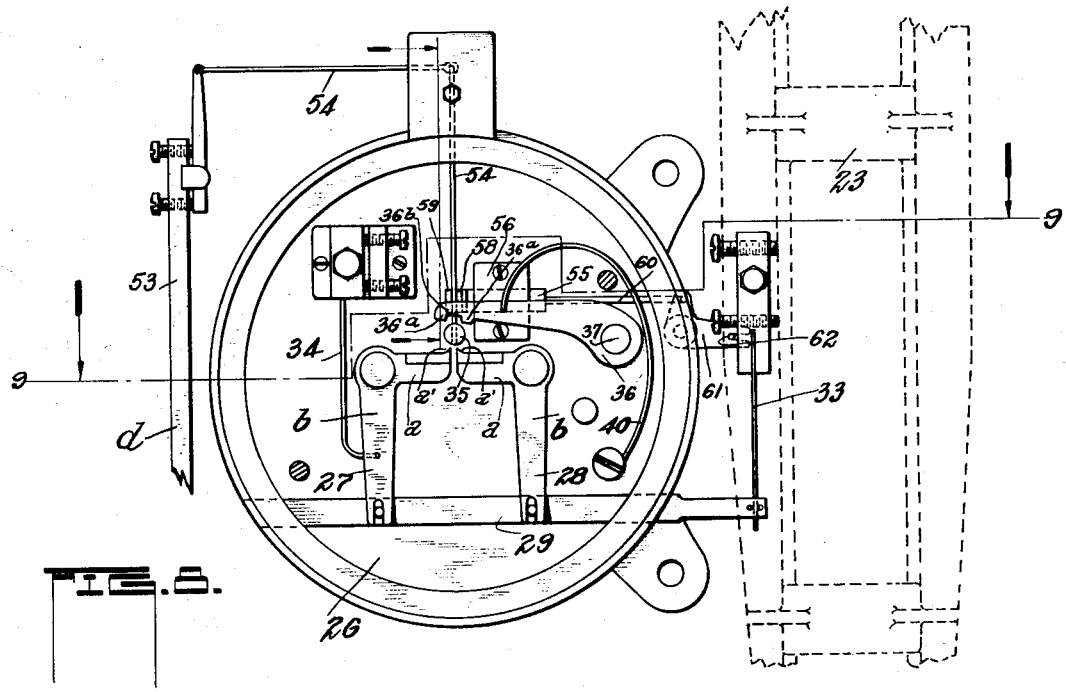
FIG. 8.
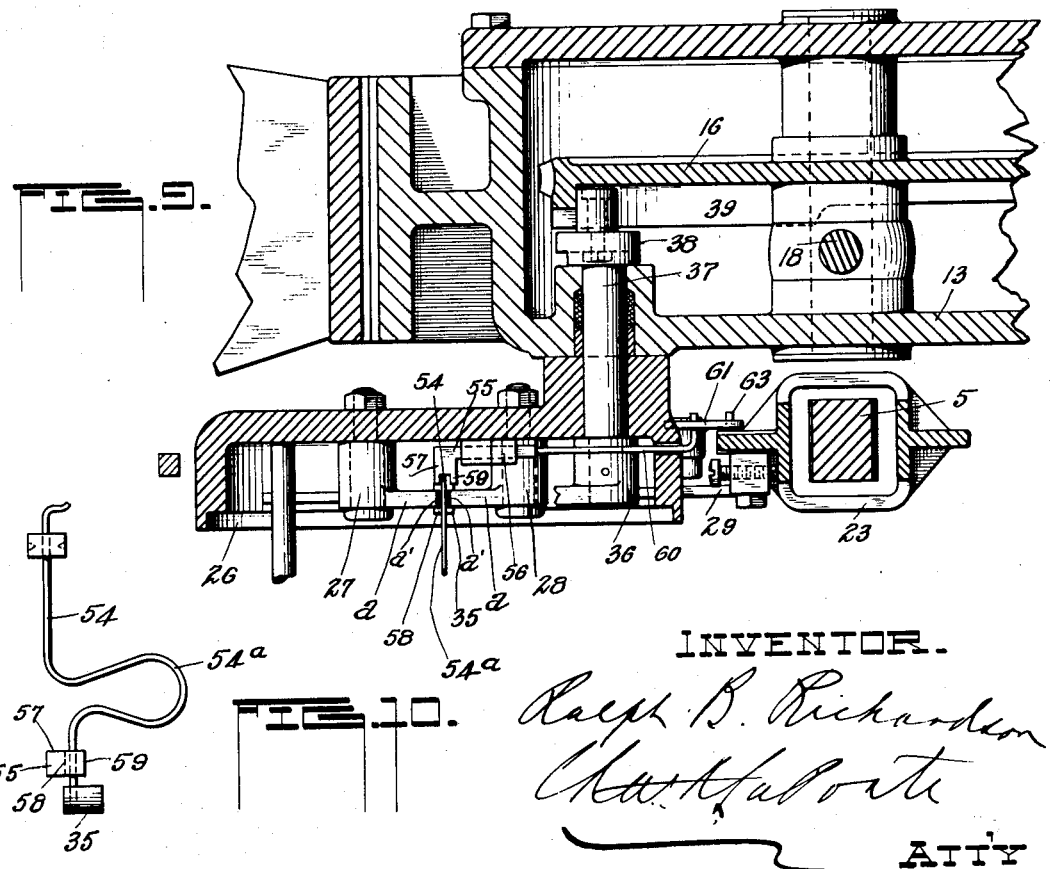
FIG. 9.
FIG. 10.
INVENTOR.
Ralph B. Richardson
ATTY Patented Nov. 23, 1926.

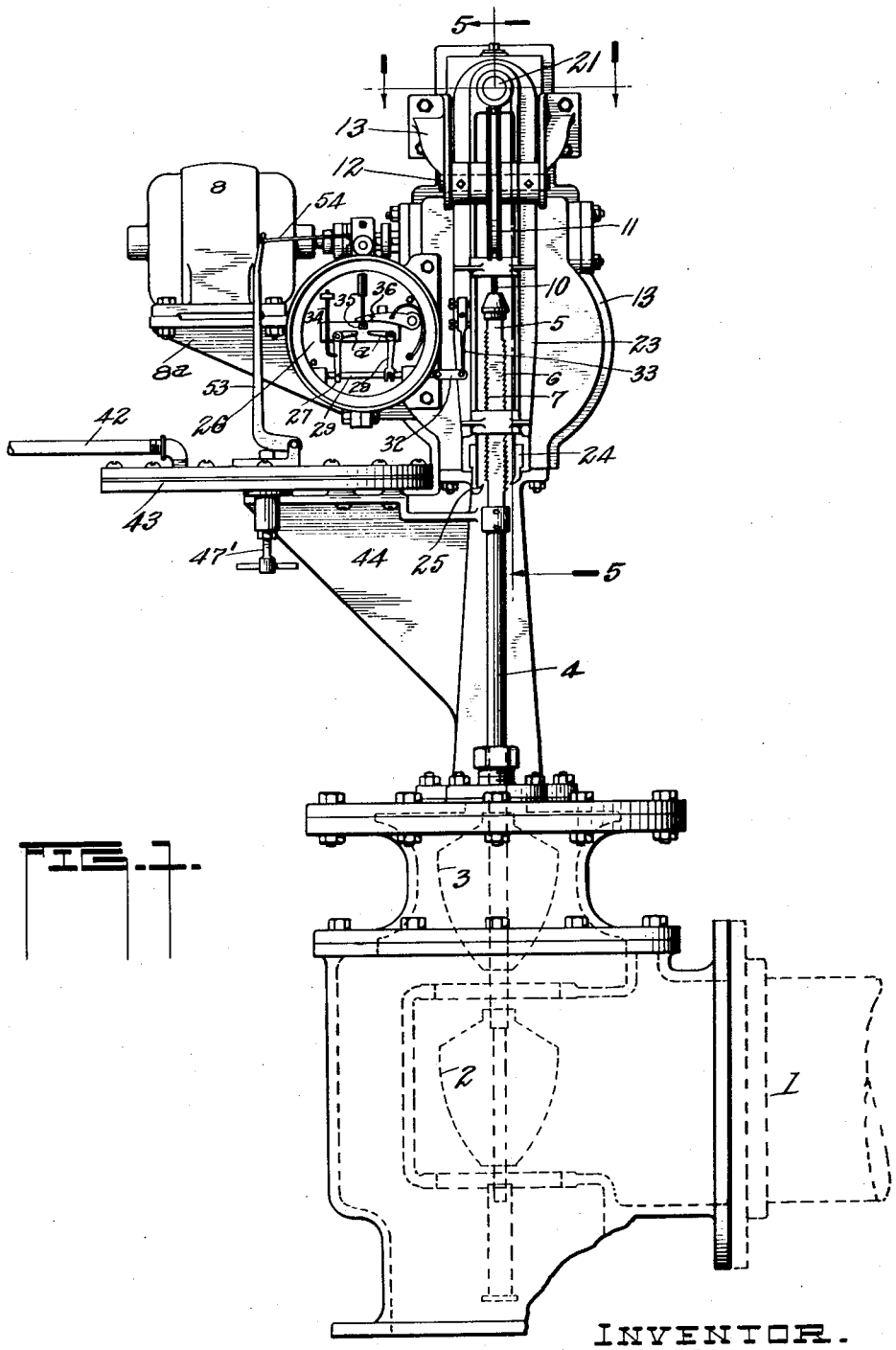

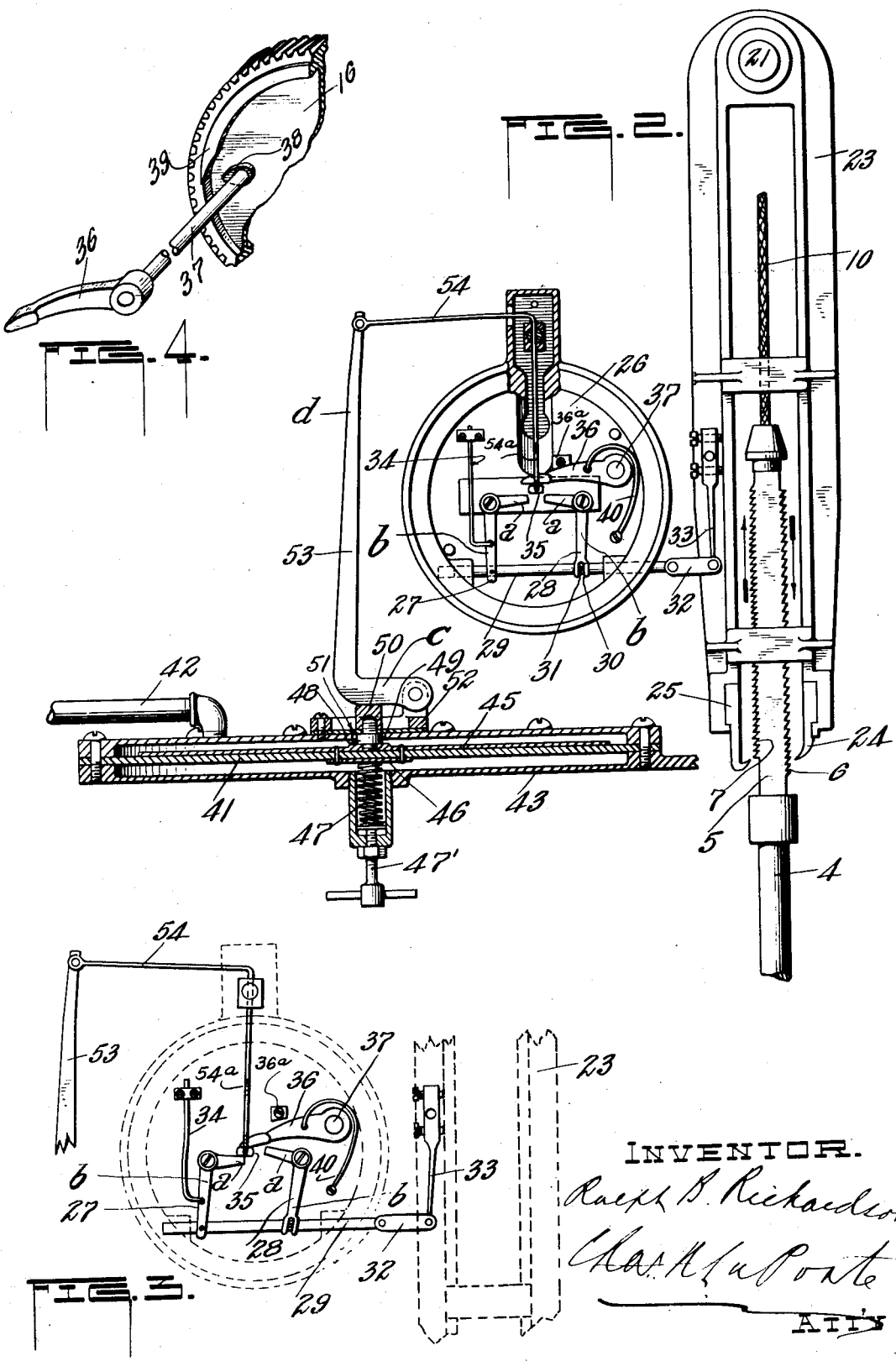

1,607,848

UNITED STATES PATENT OFFICE.

RALPH B. RICHARDSON, OF PEORIA, ILLINOIS.

PRESSURE REGULATOR.

Application filed September 11, 1922. Serial No. 587,358.

This invention has reference to pressure regulators, preferably of the fluid type, adapted particularly for maintaining approximately constant pressure conditions within retorts or ovens, although it may be found to have other and various uses, such for instance as a thermostat or temperature control for distilling, condensing, heating, refrigerating, cooking or other similar operations.

The invention has for one of its objects to provide a pressure regulator, preferably continuously operated, adapted to actuate the valves employed in the foul gas main of coal gas plants; and in the employment of means including a diaphragm, under the influence of the change in pressure in said foul mains to control the direction of movement of said valves.

The invention has for a further object to provide a pressure regulator of the character referred to, wherein a preferably constant speed motor continuously actuates the valve operating means and also continuously actuates an element which in turn preferably intermittently connects such valve operating means to the valves to open or close the same; and wherein means is provided under the influence of the change in pressure in the foul main which controls the connections between said valve operating means and said element to insure a proper connection between said valve operating means and said valves to open or close the same, and thereby maintain constant pressure conditions within a retort or oven.

That the invention may be more fully understood, reference is had to the accompanying drawings forming a part of the present description, illustrating a preferred embodiment of the invention in which:—

Figure 1 shows in elevation my improved power driven pressure regulator and its application to the foul main connected with an oven or retort house of a coal gas plant, the valve counter-balancing means being omitted;

Figure 2 is an enlarged detail, in front elevation and partly in section, of the regulator seen in Figure 1, and an element associated with the valves, the parts being in the neutral position shown in Figure 1;

Figure 3 is a detail showing the movement of the means for connecting the valve operating means to the valves;

Figure 4 is a detail in perspective showing the means operated by the motor for intermittently actuating the means for moving the valve operating means into operative relation with valves;

Figure 5 is a detail sectional view as the same would appear if taken on the line 5—5 Figure 1 and also showing the valve counter-balancing means omitted in Figure 1;

Figure 6 is a front vertical sectional view as the same would appear if taken on the line 6—6 Figure 5;

Figure 7 is a cross-section in plan as the same would appear if taken on the line 7—7 Figure 5;

Figure 8 is a detail showing a modified construction of control which includes a positively actuated means operating independently of the fluid pressure means to place the control in neutral position;

Fig. 9 is a plan in section of structural features detailed in Figure 8, as the same would appear if taken on the line 9—9 Figure 8, and Figure 10 is a detail side elevation of the controller member, shown in Figures 8 and 9.

Like characters of reference denote corresponding parts throughout the figures.

In the drawings, what is commonly called and known as the foul main connected with an oven or retort house of a coal gas plant is designated 1. This main is connected with the apparatus for refining the gas before it is transferred to the place of use, and at a suitable point in said main are preferably located valves 2 and 3 which regulate the flow of fluid through the main and also govern the vacuum or suction therein. These valves are connected with a stem 4, and extending preferably axially from said stem is a toothed bar 5, provided on opposite sides with a multiplicity of oppositely cut or formed teeth 6 and 7. The teeth 6 adapted to be engaged by means for moving the stem 4 in one direction, to cause the valves 2 and 3 to close, and the teeth 7 to be engaged by means for moving the stem 4 in the opposite direction to cause the valves 2 and 3 to open. The valve stem 4, as will be understood, is intended to be intermittently actuated, alternately in opposite directions, as conditions of pressure in the foul main 1 may require; whereas, the operating means for said stem 4 is continuously operated by power means, preferably a constant speed electric motor 8. The weight of the valves 2 and 3 is preferably counter-balanced by a weight 9 connected with the upper end of the toothed bar 5 through and by means of a suitable strand or cable 10 which passes over a sheave wheel 11 on a short shaft 12 journaled in suitable bearings at the head of a frame support, casing or housing 13. The motor is preferably supported on a bracket 8ª secured to and supported from said casing or housing, as shown.

To the motor is suitably flexibly connected a shaft 14 which is suitably journaled in the casing or housing 13, and on said shaft within said casing or housing is secured a worm gear 15 which meshes with and drives a worm wheel 16, also located within said casing or housing and journaled on a shaft 17 having a bearing in the walls of said casing or housing, see Figures 5 and 6. To the shaft 17 is eccentrically connected an arm or bar 18, which, at its opposite end is pivotally connected with a block 19 slidable in guide-ways 20 arranged within and at the upper end of said casing or housing, see Figures 5 and 6. To the block is connected a spindle 21 which passes out through and is adapted to have up and down movement in a slot 22 in a wall of the casing or housing 13 and to the projecting or protruding end of said spindle is pivotally connected a preferably depending bifurcated arm 23; the bifurcated portions of which straddle and extend down on opposite sides of the toothed bar 5, see Figures 2 and 5. To one portion of the arm 23 is connected a pawl 24 and to the other portion of said arm is connected a pawl 25. The former is adapted to be moved into contact with the teeth 6 on the bar 5, and the latter is adapted to be moved into contact with the teeth 7 on said bar, in a manner hereinafter referred to. The operation thus far is as follows:—

Assuming the motor 8 to be connected with a suitable source of power, the shaft 14, the gears 15 and 16 and the shaft 17 will impart a reciprocal movement to the arm 23 through the eccentric connection of the arm or bar 18 with the shaft 17, as will be understood. Such reciprocal movement of the arm 23 is continuous so long as the motor 8 is in operation, and until the said arm 23 is positively oscillated to bring one or the other of the pawls 24 or 25 into contact with the teeth on the bar 5, there will be no movement of the bar 5, the stem 4 and the valves 2 and 3. However, as it is necessary to maintain the vacuum in the foul main constant, and in view of the fact that the pressure in said main will vary, due to many and varying conditions, said pawls are arranged for oscillation by power applied directly from the motor, and controlled by means under the influence of the change in pressure of the fluid in said foul main, so that as such pressure varies the arm 23 will be swung, first in one direction and then in the opposite direction, so as to reciprocate said valves 2 and 3 to seat or unseat the same, as may be required to regulate and control the pressure in the foul main. Therefore, while the arm 23 is continuously reciprocated, it will only impart a like movement to the stem 4 when the pressure in the foul main changes and as such change is transmitted to the arm 23 to move the pawls 24 and 25. The arm 23 is hung so as to be substantially as sensitive as a pendulum, but as the engagement of the pawls 24 and 25 with the toothed bar 5 must be a positive one the control which is actuated under the influence of the change in pressure of the fluid in the foul main is operated direct from the motor to oscillate the arm 23 in either direction.

The control for the arm 23 is preferably housed within a transparent closure 26 secured to the casing or housing 13, one form of which is shown in detail in Figures 2 and 3 and another form of which is shown in Figures 8 and 9. Reference will be first had to the form of control shown in Figures 2 and 3:—Pivotally arranged within said closure are bell-crank levers 27 and 28, their horizontal portions a, a, normally spaced a short distance apart, see Figure 2; the end of the vertical portion b of lever 27 having a pivotal connection with a bar or rod 29 and the vertical portion b of the lever 28 provided with a slotted end 30 straddling a pin 31 on the rod 29. The rod 29 is slidably arranged within the closure and has a protruding end to which is pivotally connected a link 32, which in turn has a pivotal connection with a spring arm 33 adjustably connected with the valve operating arm 23, see Figures 2 and 3. The arm 23 and connected parts just described are preferably held in the normal positions, shown in Figure 2, by means of the spring 34 arranged within the closure 26 and having one end connected to a wall of the closure and its other end connected to the lever 27. The reciprocation of the rod 29 is against the spring 34 which acts to return the rod 29, as well as the arm 23 to normal positions, after each operation, such as illustrated in Figure 3. Normally held in a position immediately above the space or opening between the ends of portions a, a of the levers 27 and 28 is a control member 35. This member is actuated under the influence of the change in pressure of the fluid in the foul main to move it alternately over the portions a a of the levers 27 and 28, but when the desired pressure exists it is maintained in the neutral position shown in Figure 2. In the form in which the control is constructed in Figures 2 and 3, the change in the fluid pressure is relied upon to return the control member to neutral position; whereas in Figures 8 and 9, to be described, a positively actuated means is employed to return the control member to neutral position, instead of relying on the fluid pressure. The means for moving the member 35 first over a portion of the lever 27 and then over a portion of the lever 28, as the change in pressure in the foul main takes place, will be later described. The means for depressing the member 35 and causing it to engage and oscillate either of the levers 27 or 28, when moved thereabove, from the position shown in Figure 2, to a position such as shown in Figure 3, includes an arm or lever 36 connected to one end of a rock shaft 37 which terminates in the closure 26, as shown and has its opposite end terminating in the casing or housing 13 and has secured thereto a dog 38, see Figures 2, 4, and 6 which is adapted to be intermittently engaged by internally arranged cams 39 on the worm-wheel 16 for rocking said shaft, preferably with each one half revolution of said worm-wheel 16. The acting end of said arm or lever 36 lies above the member 35 so as to engage it in any of its positions, as will be explained. The cams 39, as shown, are so shaped that the rocking of the shaft 37 and oscillation of the arm or lever 36 is gradual and retained for predetermined periods and such movements terminated abruptly. With the completion of each oscillation of the shaft 37 and arm or lever 36, they are returned to the normal position shown in Figure 2 by means of a spring 40, one end connected to a wall of the closure 26 and the other end connected to the arm or lever 36, it being understood that action of the shaft 37 and the lever or arm 36 is against the tension of this spring. A stop 36ª limits the movement of the lever 36 under the influence of the spring 40. The timing of the eccentric 18, the arm 23 and the worm-wheel 16 having the cams 39 is preferably such that the cams do not act upon the dog 38 until just immediately following the dead center positions of the eccentric, or in other words, such cams act approximately coincidently with the up and down movement of the arm 23 at or about that moment when the eccentric passes the dead centers. In this way the means for oscillating the arm 23 to cause the pawls 24 and 25 respectively, to engage with the toothed bar 5 occurs approximately at the initial movement of such toothed bar, up or down, and not intermediate the stroke.

Assuming that the control member 35 has been moved to a position over the portion a of the lever 27, see Figure 3, due to a change in the pressure of the fluid in the foul main, as the shaft 14 is rotated by the motor 8 power will be transmitted to the worm-wheel 16 in the manner described, and as such wheel rotates the cams 39 thereon will ride against the dog 38 and in doing so will cause the shaft 37 to be oscillated and depress the arm or lever 36 into engagement with the member 35 and cause said member, in turn, to contact with the end of the portion a of the lever 27 and reciprocate the rod 29 so as to cause the pawl 24 to engage the teeth 6 on the bar 5. Should the member 35 be moved to a position above the lever 28, the action would be substantially the same, except that the rod 29 would be reciprocated in the opposite direction causing the pawl 25 to engage with the teeth 7 on the bar 5.

The control member 35 is preferably oscillated from its position shown in Figure 2 to a position over either of the levers 27 and 28, as for instance over the portion a of the lever 27, as shown in Figure 3, by means of a diaphragm 41, and the movement of such diaphragm is controlled by the pressure in said main 1 which is reflected onto the diaphragm through a pipe 42 in communication with said foul main 1. The diaphragm construction is best seen in Figure 2 wherein the diaphragm proper is enclosed within a casing 43 supported on a bracket extension 44 from the casing or housing 13. The diaphragm 41 is preferably of leather or equivalent material to either face of which is attached preferably metal plates 45 and 46. Yieldable pressure regulating means for the diaphragm includes a spring 47 engaging the plate 46, the tension in which is adjusted through and by means of the adjusting screw 47'. To the plate 45 is connected a stud 48 which operates through an opening 49 in a wall of the casing 43 and has connection with a member 50 and between which is held a gasket or diaphragm 51 securely held at its edges by means of a plate 52 to which is pivoted an angular arm or lever 53, the short horizontal portion c of which rests on the member 50 to rise and fall therewith under the action of the diaphragm 41 due to change of pressure of the fluid, and the longer or preferably vertically extended portion d of said arm or lever has pivotally connected thereto a rod 54 which is preferably angular in shape and extends into the closure 26 and is operatively connected to the member 35; being preferably bowed outwardly and inwardly, as at 54ª, see Figure 2 to allow for the acting end of the lever 36 to engage the member 35 and to yield to the pressure applied to the member 35 when the same is caused to engage the levers 27 and 28 and to return the same to engaging position with the return of the lever 36 to its inoperative position. Normally the lever 53 and the rod 54 retains the member 35 in a position above the space separating the ends of the portions a, a of the levers 27 and 28, so that the oscillation of the shaft 37 and the arm or lever 36, due to the operation of the motor will cause the arm or lever 36 to engage and depress the member 35 between the ends of the portions a, a of said levers 27 and 28 without disturbing the rod 29 or the arm 23. These parts only being operated when the diaphragm 41 moves, resulting in a movement of the lever 53 and positioning the member 35 over either the lever 27 or 28, as explained.

Reference being had to Figures 8, 9 and 10 it will be observed that there are certain refinements in structural details of parts of the mechanism previously described, at least some of which are necessary, due to the modifications therein disclosed, which includes a positively actuated means for returning the controlling member to its neutral position, after each operation by the diaphragm 41.

As previously shown, the controller member 35 was normally retained in a neutral position at a point above and midway between the spaced ends of the portions a, a of the bell crank levers 27 and 28. In the modified form the end of the depresser lever 36 is provided or formed with engaging lugs 36ª separated by a recess 36ᵇ therebetween. Such recess normally overlying the member 35 to receive the latter when the member 35 is in a neutral position and the lever 36 is depressed. The lugs 36ª are the means to engage and depress the member 35 when the same is alternately oscillated therebeneath through the action of the diaphragm 41. And the ends a a of the bell-crank levers 27 and 28 approach to within a short distance of each other, as shown, and are each formed with upturned terminal lips or projections a′, a′ providing an obstruction or stop for the member 35 when the same is depressed through the action of the depresser lever 36 and prevents accidental displacement or dislodgement of the member 35 on the portion a a of said bell-crank levers 27 and 28. The shape of the rod 54 is modified slightly, see Figure 10 and the member 35 is shown as a round lug, being projected forwardly of the rod 54 for the acting end of the depresser lever 36 thereabove.

In Figures 2 and 3, as previously pointed out, the mechanism of the controller and associated parts, is such, that the diaphragm 41 is relied on, due to pressure or lack of pressure in the foul main to oscillate the member 35 to operative positions and to return the same to neutral position after each operation not taking into consideration the yieldable feature produced by bowing the rod 54, at 54ª. In Figures 8 and 9 there is shown a means for positively returning the member 35 to its neutral position over the levers 27 and 28, after each operation by the diaphragm 41, and preferably by a means actuated direct from the valve operating means, which is operated direct from the motor 8.

The preferred means for returning the member 35 to neutral position, after each operation, includes a bar 55 slidable in a guide 56 arranged in the housing or closure 26, and the forward end of said bar is provided with an angular end 57 having a recess 58 between spaced lugs 59, the recess receiving the rod 54 which passes therethrough and between said lugs, and the lugs acting to alternately engage the rod 54, during reciprocation of said bar, to place the member 35 in neutral position, subsequent to each operation. Said bar 55 is connected to a rod 60 which passes out of the housing or closure 26, see Figure 9 and is connected to the short arm of a bell-crank lever 61, see Figure 8 pivotally connected in a suitable manner with the machine housing or frame, and the end of the long arm of said lever is provided with an open slot 62 through which projects and has movement a pin 63 connected to the valve operating arm 23. It will thus be seen that the bar 55 is positively actuated from the motor 8 through the reciprocation of the arm 23. The rod 54 is flexible, so that it is immaterial what position the bar 55 is in when the diaphragm 41 acts to oscillate the rod 41 and the controller member 35, as said rod may be moved; but just as soon as the member 35 is released by its actuating means, one or the other of the lugs 59 on the bar 55 will act to restore the member 35 to its neutral position, independent of any action, or lack of action, of the fluid pressure in the foul main.

The motor 8 furnishes the power to move the pawls 24 and 25 into engagement with the teeth 6 and 7 on the bar 5 and the power to reciprocate said bar 5 after such engagement to cause the valves to be opened or closed. The power necessary to position the controlling member 35 in either of its operating positions over the levers 27 and 28 is negligible, and therefore the member 35 is sensitive to the slightest change in pressure and to the slightest change in the position of the diaphragm 41. As will be understood, when there is slightly too much pressure on the diaphragm 41 one pawl on the arm 23 engages teeth on the bar 5 to open the valves, until the desired pressure exists, when neither pawl is actuated and the valves remain open; if, the pressure on the diaphragm 41 becomes slightly less than desired, the other pawl engages teeth on the bar 5 to close the valve, until the desired pressure condition is restored, when the controlling means resumes its normal position.

In explanation of the various terms and expressions used in the appended claims, the continuously actuated valve operated means, has reference to the arm 23 provided with pawls 24 and 25 adapted to alternately engage the teeth of the toothed bar 5 to close and open the valves 2 and 3. The motor operated means arranged to intermittently connect the valve operating means with the valves, or as stated in one or two instances, to be selectively actuated by a controller for intermittently and alternately connecting the valve operating means with the valves, has reference to the bell-crank levers 27 and 28 operated alternately by the controller 35 thru engagement therewith of the lever actuated from the motor, said bell-crank levers 27 and 28, as shown, being in operative connection with the arm 23. The pressure actuated means, or the means under the influence of the change in pressure in the foul gas main, has reference to the diaphragm 41 and the operative connections therebetween and the controller 35, which, when moved, brings about a selective operation of the bell-crank levers 27 and 28, resulting in the oscillation of the arm 23 and reciprocation of the bar or rod 4 to open or close the valves 2 and 3.

I have shown and described a preferred form and application of my pressure regulator, realizing that it is adapted to many and various uses subject of course to modifications of structure in such adaptations, and I therefore do not wish to be limited in the spirit or scope of the invention, except as may be expressly stated in the claims. To those skilled in the art it will be apparent that instead of the mechanically arranged means for actuating the valve operating means to cause the same to have an intermittent connection with the valves, I may employ electrical means including two solenoids so arranged in an electrical circuit that as the diaphragm floats up and down to change in pressure in the foul main, one of said solenoids will act to move the valve connecting means in one direction, and the other of said solenoids will act to move the valve connecting means in an opposite direction. I am also, not unmindful of the fact the valve operating means may be employed to operate two valves, as shown, or one, depending of course on the character of the valve means employed.

Furthermore, the invention is adapted as a control of the draft on boilers, in which case a diaphragm could be used or a spring weighted piston, in the event the draft is to depend on the steam pressure. The draft control may be natural or supplied by fans, such as used in economizer work.

A further use of the invention is in the control of pumps, fans or compressors supplying any fluid under negative or positive pressure.

What I claim is:—

1. In a pressure regulator, in combination with controlling valves, a motor, valve operating means continuously actuated by said motor, means also actuated by said motor adapted to intermittently connect said valve operating means with said valves, and pressure actuated means adapted to control the connection and disconnection of the valve actuating means with the valves and thereby the opening or closing of said valves.

2. In a pressure regulator, in combination with controlling valves, a motor, valve operating means continuously actuated by said motor, means also actuated by said motor adapted to intermittently connect said valve operating means with said valves, and fluid pressure actuated means adapted to control the connection and disconnection of the valve actuating means with the valves and thereby the opening or closing of said valves.

3. In a pressure regulator, in combination with controlling valves, a motor, valve operating means continuously actuated by said motor, means also actuated by said motor adapted to intermittently connect said valve operating means with said valves, a fluid pressure actuated means adapted to control the connection and disconnection of the valve actuating means with the valves and thereby the opening and closing of said valves, and a positively operated means independent of the fluid pressure for placing said fluid actuating means in its neutral position.

4. In a pressure regulator, in combination with controlling valves, a motor, valve operating means continuously actuated by said motor, means also actuated by said motor adapted to intermittently connect said valve operating means with said valves, a fluid pressure actuated means adapted to control the connection and disconnection of the valve actuating means with the valves and thereby the opening and closing of said valves, and means actuated by the valve operating means to place said fluid pressure actuated means in its neutral position.

5. In a pressure regulator, in combination with controlling valves, a valve actuating means including a reciprocal and oscillatory means, a motor, means for imparting continuous reciprocal movement to said valve actuating means from said motor, means operated by the motor for imparting alternate oscillatory movement to said valve actuating means, and pressure actuated means for controlling the direction of oscillatory movement imparted to said valve actuating means and thereby the opening or closing of said valves.

6. In a pressure regulator, in combination with controlling valves, a diaphragm sensitive to changes in pressure conditions and actuatable thereby, a continuously operable motor, means mechanically operated by said motor to open or close said valves, means also mechanically operated by said motor to govern the valve actuating means, and means operable by said diaphragm for controlling the actuation of said governing means.

7. In a pressure regulator, in combination with controlling valves, valve actuating means, governing means for said valve actuating means, controlling means for said governing means, a motor, means to impart continuous movement to said valve actuating means from said motor, means to impart intermittent movement to said governing means from said motor, and pressure actuated means for moving said controlling means and thereby govern the opening or closing of said valves.

8. In a pressure regulator, in combination with governing valves, reciprocal means to open or close said valves, a motor, means connecting said motor and reciprocal means to impart continuous movement to the latter, said reciprocal means including selective valve engaging means, governing means to control said selective valve engaging means and thereby the opening or closing of said valves, means operated by the motor to actuate said governing means, and means to control the actuation of said governing means from said motor including a diaphragm sensitive to changes in pressure and actuatable thereby.

9. In a pressure regulator, in combination with controlling valves, a motor, means operated from the motor adapted to actuate said valves, said valve actuating means including selective valve engaging means, means to operate said selective valve engaging means, means intermittently operated from the motor and adapted to impart movement to the operating means of said selective valve engaging means, controlling means between said last mentioned motor operated means and said selective valve operating means, and pressure actuated means adapted to impart movement to said controlling means.

10. In a pressure regulator, in combination with controlling valves, means to actuate said valves including selective valve engaging means, a motor, operating connections between said motor and said valve actuating means, means to move said selective valve engaging means alternately in opposite directions, motor operated means adapted to impart movement to said selective moving means, a controller between said last mentioned motor operated means and said selective moving means to govern the direction of movement of the latter, and pressure actuated means for imparting movement to said controller.

11. In a device of the character described, in combination, a housing, a controller member supported for oscillatory movement therein, means associated with said member adapted to be actuated from a suitable source of power, a selective actuating means for a valve moving means so arranged within said housing as to be alternately engaged by said controller member, a member adapted to actuate said controller to cause it to operate said selective valve actuating means, and means connectible with power adapted to impart intermittent movement to said member.

12. In a device of the character described, in combination, a housing, a controller member supported for oscillatory movement therein, means associated with said member adapted to be actuated from a suitable source of power, a selective actuating means for a valve moving means so arranged within said housing as to be alternately engaged by said controller member, a member adapted to actuate said controller to cause it to operate said selective valve actuating means, means connectible with power adapted to impart intermittent movement to said member, and means independent of the controller moving means to place said controller member in neutral position following each operation.

In witness whereof, I have hereunto affixed my hand and seal this 8th day of September, 1922.

RALPH B. RICHARDSON